United States Patent [19]

Allgäuer

[11] Patent Number: 5,187,545
[45] Date of Patent: Feb. 16, 1993

[54] INTEGRATED OPTICAL POSITION MEASURING DEVICE AND METHOD WITH REFERENCE AND MEASUREMENT SIGNALS

[75] Inventor: Michael Allgäuer, Stein, Fed. Rep. of Germany

[73] Assignee: Dr. Johannes Heidenhain GmbH, Traunreut, Fed. Rep. of Germany

[21] Appl. No.: 629,842

[22] Filed: Dec. 19, 1990

[30] Foreign Application Priority Data

Dec. 23, 1989 [EP] European Pat. Off. ........ 89123897.4

[51] Int. Cl.$^5$ .............................................. G01B 9/02
[52] U.S. Cl. ................................... 356/358; 356/356; 385/12
[58] Field of Search ...................... 356/358, 356, 354; 350/96.11; 385/12

[56] References Cited

U.S. PATENT DOCUMENTS

| | | |
|---|---|---|
| 4,286,838 | 9/1981 | Huignard et al. |
| 4,717,255 | 1/1988 | Ulbers. |
| 4,744,661 | 5/1988 | Ulbers et al. |
| 4,865,453 | 9/1989 | Gidon et al. ......................... 356/358 |
| 4,938,595 | 7/1990 | Parriaux et al. |
| 4,955,718 | 9/1990 | Michel. |

OTHER PUBLICATIONS

Burns et al., "3×2 Waveguide Gyroscope Couplers: Theory", *IEEE Journal of Quantum Electronics*, vol. QE-18, N. 10, Oct. 1982.

Ura et al., "Integrated-Optic Interferometer Position Sensors", *IEEE Journal of Lightwave Technology*, vol. 7, No. 2, pp. 270-3, Feb. 1989.

*Primary Examiner*—Samuel A. Turner
*Attorney, Agent, or Firm*—Willian Brinks Olds Hofer Gilson & Lione

[57] ABSTRACT

A position measuring apparatus for measuring the position of an object having an integrated optical circuit on a substrate comprising a first grating for diffracting a light beam into a reference bundle and a measuring bundle. The first grating couples the reference bundle to an input of a coupler and decouples the measuring bundle from the substrate. The measuring bundle is directed to a reflecting element on the object wherein the measuring bundle is reflected from the object. The coupler has means for inputting signals and for outputting signals wherein the input signals are brought into interference. A second grating couples the reflected measuring bundle to another input of the coupler. Detection means detect the outputs of the coupler and generate phase displaced signals representative of the outputs.

16 Claims, 2 Drawing Sheets

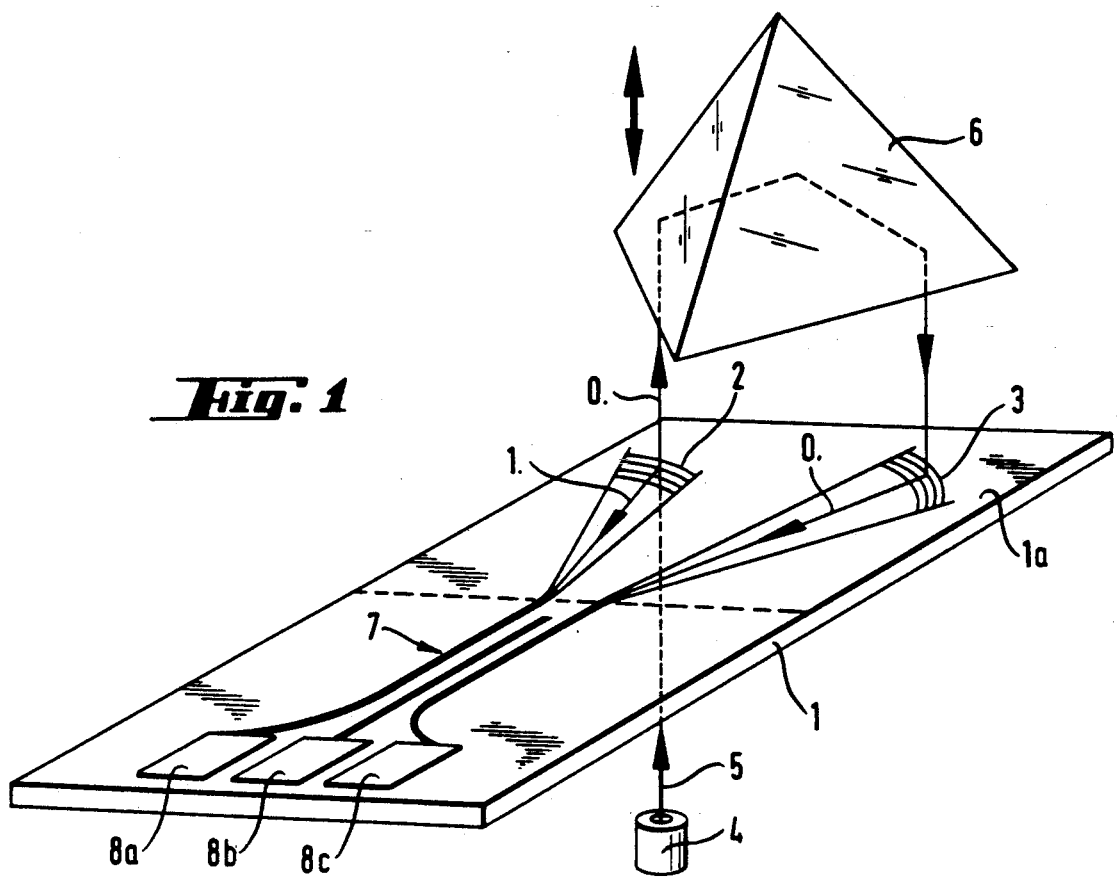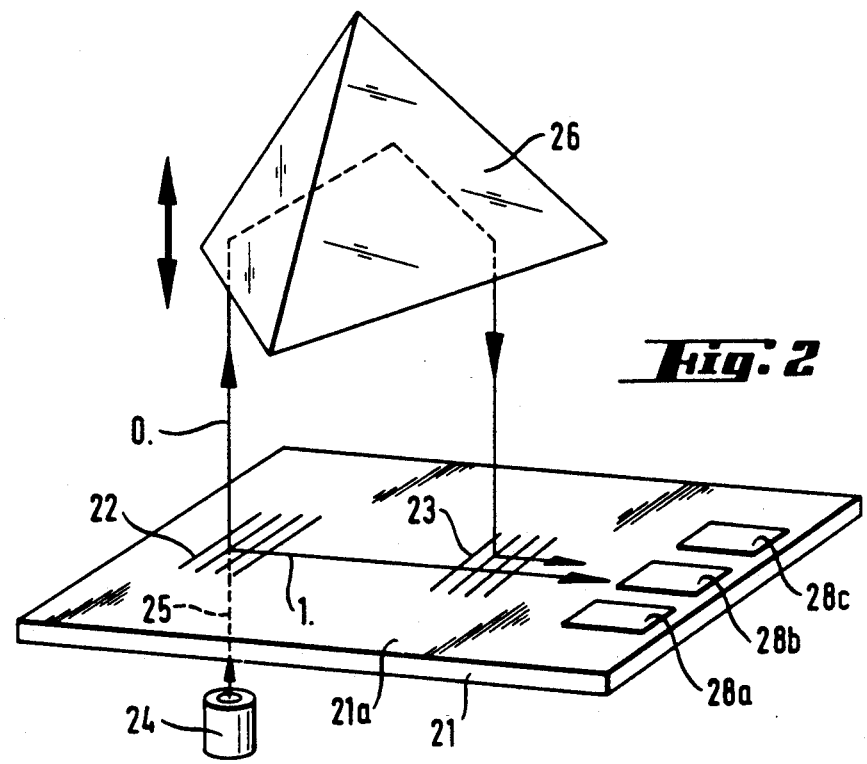

INTEGRATED OPTICAL POSITION MEASURING DEVICE AND METHOD WITH REFERENCE AND MEASUREMENT SIGNALS

BACKGROUND OF THE INVENTION

1. Field of the Invention

The present invention is generally directed to a photoelectric measuring apparatus, and more particularly, an apparatus creating measurement and reference signals by components formed on an integrated optical circuit.

2. Description of the Prior Art

A wide variety of photoelectric measuring devices exist, however, they all suffer from disadvantages the present invention eliminates.

Typically, an integrated optical circuit creates a measuring signal and a reference signal, the reference signal being used to determine the direction of movement while the measurement signal determines the amount of movement. In an article by Ura, et al. "Integrated-Optic Interferometer Position Sensor," *Journal of Light-wave Technology*, Vol. 7, No. 2, February 1989, an integrated optical interferometer is disclosed. Part of a beam emitted from a laser is diffracted and strikes a moving mirror which reflects the beam back to the waveguide thereby forming signal waves. The other part of the beam emitted from the laser strikes a Bragg reflector. The Bragg reflector focuses the reflected beams into photodiodes to create reference waves. The signal and reference waves interfere and are detected by the photodiodes so that displacement of the moving mirror is detected through periodic modulation of the output photo currents.

German reference DE-C2 36 30 887 discloses a measuring arrangement on a substrate wherein a waveguide is connected with a laser. At one end of the waveguide there is either a coupling-in or decoupling grid for the measuring beam. By means of a coupler there is obtained from the measuring waveguide, a so-called reference waveguide which ends on a metallized edge of the substrate which forms a mirror for the reference waveguide. Such mirrors or Bragg reflectors are difficult to construct and produce in an integrated optical system. In addition, measuring arrangements that employ lenses are difficult to produce in an integrated optical system.

Accordingly, it is a primary object of the present invention to provide a measuring device that utilizes reflectors and lenses in an integrated optical system thus facilitating the construction of the device and reducing the size of the measuring device.

Another object of the present invention is to provide a measuring device that may be economically produced and easily adapted to various measuring requirements while operating free from interference.

SUMMARY OF THE INVENTION

The present invention is directed to an apparatus and method for detecting the position of an object using an integrated optical circuit to create reference and measurement signals.

An integrated optical circuit located on a substrate receives a beam of light from a light emitting source. The light source may be integrated on the substrate or it can be located apart from the substrate. The beam is divided into a measuring bundle comprising an order of diffraction of the beam and a reference bundle comprising another order of diffraction of the beam. The reference beam is coupled to a waveguide located in or on the substrate. The measuring bundle is directed to a reflecting element on the object whose position is being measured. The measuring beam is reflected from the object and coupled to a waveguide in the substrate. The reference bundle and the measuring bundle are brought into interference and the interference is detected by photodetectors thereby generating phase displaced signals.

BRIEF DESCRIPTION OF THE DRAWINGS

Further objects and advantages of this invention will become apparent and readily appreciated from the following detailed description of the present invention, taken in conjunction with the accompanying drawings, of which:

FIG. 1 illustrates a photoelectric measuring device in accordance with a first preferred embodiment of the present invention;

FIG. 2 illustrates a photoelectric measuring device in accordance with a second preferred embodiment of the present invention.

DETAILED DESCRIPTION OF THE PRESENTLY PREFERRED EMBODIMENTS

Figure 3:
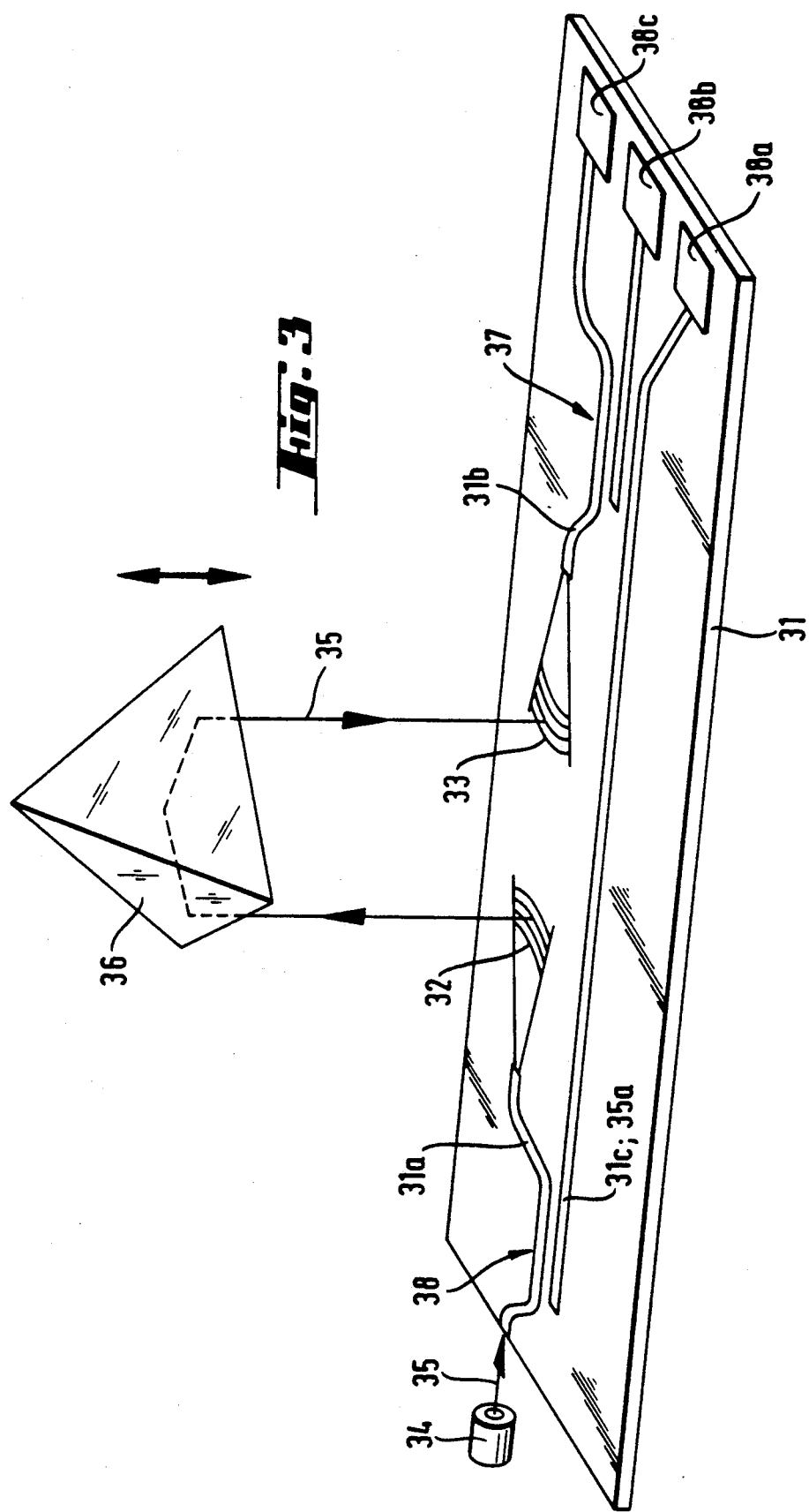
FIG. 3 illustrates a photoelectric measuring device in accordance with a third preferred embodiment of the present invention.

The preferred embodiments of the present invention will hereinafter be described in detail with reference to the accompanying drawings.

FIG. 1 illustrates a first preferred embodiment of the present invention. The scale used in the Figures has been adjusted to clarify the invention. A planar light waveguide 1a is provided either in or on the surface of a substrate 1. A light source 4, such as a laser diode, emits a light beam bundle 5 from underneath the substrate 1 to an integrated first diffraction grating 2. The first diffraction grating 2 comprises a circular grating which diffracts the beam bundle 5 into partial beam bundles of various orders of diffraction. Specifically, the beam bundle 5 impinges upon the first diffraction grating 2 at an angle virtually perpendicular to the plane of the substrate 1. Thus the virtually perpendicularly incident beam bundle 5 is diffracted into its zero (0) order beam and its first (+1 or -1) order beam.

The zero order beam bundle impinges upon a retroreflector 6. The retroreflector 6 can be a triple prism as shown in FIG. 1, or it may comprise spherical lenses, "cat's eyes", self-focusing lenses or any other component that reflects incident rays parallel to themselves regardless of the incident direction of the rays. The retroreflector 6 is attached to the moving object, for example, the cradle of a machine tool (not shown). The substrate 1 can be mounted, for example, to the base of the machine tool (not shown).

The first order beam bundle is deflected and coupled to the planar light waveguide 1a by the first diffraction grating 2. It is known for example from U.S. Pat. No. 4,286,838, which is incorporated herein by reference, how to transmit light with the aid of coupling grids into waveguides of integrated optical circuits. The first order beam bundle is focused upon an input of an integrated optical coupler 7. The coupler may be a so-called 2×3 coupler also known as a three-branch junction. The theory and operation of this type of coupler are described in an article by Rolliam, "Waveguide Gyroscope Couplers: Theory" *IEEE Journal of Quantum Electronics*, Volume QE-18, No. 10 October 1982. The coupler 7 has three outputs which are transmitted to three detectors 8a, 8b and 8c. The signals detected at 8a, 8b and 8c are then converted into electric signals and transmitted to an electronic evaluation circuit (not shown).

The individual components employed may comprise elements commonly known in the art. The components of the optical circuit may also comprise fiber optics, the use of which, however, does not necessitate additional exemplary drawings. Those skilled in the art will readily understand and recognize such an arrangement containing corresponding fiber optic components.

The first order beam bundle, which is deflected in the circular grid 2, input into the coupler 7 forms the reference arm of the interferometer.

The zero order beam bundle is reflected by the reflector 6 and impinges upon an integrated second diffraction grating 3. The second diffraction grating 3 is also a circular grid. The zero order beam is coupled to the planar light waveguide 1a by the second diffraction grating 3. The zero order beam is focused upon an input of the coupler 7 and is detected in the detectors 8a, 8b and 8c to form the measuring arm of the interferometer.

In the coupler 7 the partial beam bundles of the measuring arm comprising the first order beam and the partial beam bundles of the reference arm comprising the zero order beam are brought into interference. The detectors 8a, 8b and 8c detect these interfering arms and generate three signals which are phase displaced with respect to one another.

FIG. 2 illustrates a photoelectric measuring device in accordance with a second preferred embodiment of the present invention. Linear diffraction grids 22 and 23 are used instead of the circular grids 2 and 3 shown in FIG. 1. A planar light waveguide 21a is provided either in or on the surface of a substrate 21. A light source 24, such as a laser diode, emits a light beam bundle 25 from underneath the substrate 21 to the integrated first diffraction grating 22. The first diffraction grating 22 is a linear grid which diffracts the beam bundle 25 into partial beam bundles of various orders of diffraction. Specifically, the beam bundle 25 impinges upon the first diffraction grating 22 at an angle perpendicular or virtually perpendicularly to the plane of the substrate 21.

A partial beam bundle of the zero order (0) impinges upon a retroreflector 26. The retroreflector 26 corresponds to the retroreflector 6 shown in FIG. 1. The retroreflector 26 directs the zero order beam bundle to impinge upon a second diffraction grating 23. The second diffraction grating 23 may also be a linear grid. The zero order beam is diffracted again and coupled to the planar light waveguide 21a.

The first diffraction grating 22 also diffracts the beam bundle 25 into a partial beam bundle of the first order (+1 or −1). The first order beam passes through the second diffraction grating 23. In this embodiment, the zero order beam bundle and the first beam bundle order are three dimensional, in contrast to being so thin as to be two dimensional, and the planar light waveguide layer 21a has a finite thickness. The two flat waves of the zero order and first order beams interfere within this layer. To create an interference fringe pattern, the second diffraction grating 23 can be positioned at a slight oblique setting with respect to the first diffraction grating 22. The same result can be achieved by using a circular grid for the second diffraction grating 23 instead of a linear grid as shown. There are other ways known to those skilled in the art for generating interference fringe patterns and the present invention is not limited to those specifically enumerated. The interference fringe are detected by detectors 28a, 28b and 28c which transform these signals into phase-displaced signals.

Also, to achieve phase-displaced interference signals, a phase-shifting element (not shown) can be placed in the reference beam path thereby causing the reference beam to undergo a delay.

In an alternative embodiment, the beam bundle 25 can also impinge the substrate 21 at an angle parallel to the plane of the substrate 21 (not shown). If the beam bundle 25 enters the substrate 21 at an angle parallel to the plane of the substrate 21, the unrefracted zero order beam forms the reference arm and the first order beam, which is refracted at grating 22, forms the measuring arm. Measurement of the interference between the reference and measuring arms by the detectors may proceed as in the preceding examples. This is a special case and is an exception to the arrangement shown in FIGS. 1 and 2 where the zero order beam forms the measuring arm and the first order beam forms the reference arm.

FIG. 3 illustrates a photoelectric measuring device in accordance with a third preferred embodiment of the present invention. A planar light waveguide 31 is provided either in or on a substrate. A light source 34, such as a laser diode, emits a light beam bundle 35 into a light waveguide 31a. The beam bundle 35 is then fed to a coupling-out grid 32 which decouples the beam 35 in the direction of the retroreflector 36. The retroreflector 36 is the same as the reflector 6 shown in FIG. 1. The reflector 36 reflects the beam 35 to impinge upon coupling-in grid 33. The coupling-in 33 and coupling-out grids 32 are circular grids. The coupling-in grid 33 focuses the beam 35 into a light waveguide 31b. In a practical sense, light waveguide 31b may be considered a continuation of waveguide 31a.

The reference arm is formed by a partial beam bundle 35a which is decoupled from the light waveguide 31a by means of a coupler 38. The beam bundle 35a is conducted over a light waveguide 31c to a coupler 37.

In the coupler 37, the partial beam bundles of the measuring bundle 35 interfere with the partial beam bundles of the reference beam bundle 35a in a known manner and interference signals are generated. The interference signals are detected by detectors 38a, 38b and 38c and converted into signals phase-displaced with respect to each other.

While this invention has been shown and described in connection with preferred embodiments, it is apparent that certain changes and modifications, in addition to those mentioned above, may be made from the basic features of the present invention. Accordingly, it is intended that the scope of the invention be defined by the following claims, including all equivalents.

What is claimed is:

1. A position measuring apparatus for measuring the position of an object having an integrated optical circuit on a substrate comprising:

means for separating a beam from a light emitting source into a reference bundle and a measuring bundle;

means for coupling said reference bundle to a waveguide;

means for uncoupling said measuring bundle from the plane of said substrate, said measuring bundle directed to a reflecting element on the object wherein said measuring bundle is reflected from the object;

means for coupling said reflected measuring bundle to the substrate spatially separated from said means for coupling said reference bundle to said waveguide wherein said measuring bundle and said reference bundle interfere with each other; and means for detecting said interference and for generating phase displaced signals representative of said detected interference, wherein said means for separating said beam into said reference bundle and measuring bundle, said means for coupling said reference bundle to said waveguide and said means for uncoupling said measuring bundle from said substrate comprises a first diffraction grating.

2. A position measuring apparatus according to claim 1 wherein said first diffraction grating comprises a circular grid.

3. A position measuring apparatus according to claim 1 wherein said first diffraction grating comprises a linear grid.

4. A position measuring apparatus according to claim 1 wherein said first diffraction grating and said means for coupling said reflected measuring bundle comprise linear grids.

5. A position measuring apparatus according to claim 1 wherein said first diffraction grating is a linear grid and said means for coupling said reflected measuring bundle is a circular grid.

6. A position measuring apparatus according to claim 1 wherein said first diffraction grating and said means for coupling said reflected measuring bundle are situated obliquely with respect to one another.

7. A position measuring apparatus for measuring the position of an object having an integrated optical circuit on a substrate comprising:

a first grating for diffracting a light beam into a reference bundle and a measuring bundle, said first grating coupling said reference bundle to an input of a coupler and decoupling said measuring bundle from the plane of said substrate, said measuring bundle directed to a reflecting element on the object wherein the measuring bundle is reflected from the object, said coupler having means for inputting signals and for outputting signals wherein said input signals are brought into interference;

a second grating for coupling said reflected measuring bundle to another input of said coupler; and means for detecting said outputs of said coupler and for generating phase displaced signals representative of said outputs.

8. A position measuring apparatus having an integrated optical circuit on a substrate comprising:

a first waveguide for conducting a beam emitted from a beam source;

means for decoupling a reference bundle from said beam conducted along said first waveguide;

a second waveguide for conducting said decoupled reference bundle;

a decoupling grid for decoupling said beam from the plane of said first waveguide after decoupling said reference bundle, said beam directed to a reflecting element on the object wherein the beam is reflected from the object;

a coupling-in grid for coupling said reflected beam to a third waveguide;

a coupler having means for inputting and outputting signals wherein said input signals are brought into interference, said inputs comprising said reference bundle conducted in said second waveguide and said reflected beam conducted in said third waveguide; and means for detecting said outputs of said coupler and generating phase displaced signals representative of said outputs.

9. A method of detecting the position of an object using an integrated optical circuit on a substrate comprising the steps of:

separating a beam emitted from a source into a reference bundle and a measuring bundle;

coupling said bundle to a waveguide by a first coupler;

uncoupling said measuring bundle from the plane of said substrate wherein said measuring bundle is directed to a reflecting element on the object and reflected from the object;

coupling said reflected measuring bundle to said substrate by a second coupler, said second coupler being spatially separated from the first coupler wherein said measuring bundle and said reference bundle interfere with one another; and detecting said interference and generating phase displaced signals representative of said detected interference.

10. A method according to claim 9 wherein the steps of separating a beam, coupling said reference bundle to a waveguide and uncoupling said measuring bundle are performed by a first diffraction grating.

11. A method according to claim 9 wherein the steps of separating a beam and the coupling said reference bundle steps are performed by a coupler.

12. A method according to claim 10 wherein said first diffraction grating comprises a linear grid and the step of coupling said reflected measuring bundle is performed by a linear grid.

13. A method according to claim 10 wherein said first diffraction grating comprises a linear grid and the step of coupling said reflected measuring bundle is performed by a circular grid.

14. A method of detecting the position of an object using an integrated optical circuit on a substrate comprising the steps of:

diffracting a light beam into a reference bundle and a measuring bundles with a first diffraction grating;

coupling said reference bundle to an input of a coupler by said first diffraction grating, said coupler having means for inputting signals and for outputting signals wherein said input signals are brought into interference;

decoupling said measuring bundle from the plane of said substrate with said first diffraction grating; said measuring bundle directed to a reflecting element on an object wherein the measuring bundle is reflected from the object;

coupling said reflected measuring bundle with a second grating to another input of said coupler; and detecting said outputs of said coupler and generating phase displaced signals representative of said outputs.

15. A method according to claim 14 wherein said first grating and said second grating comprise circular grids.

16. A method of detecting the position of an object using an integrated optical circuit on a substrate comprising the steps of:

conducting a beam emitted from a beam source over a first waveguide;

decoupling a reference bundle from said beam conducted over said first waveguide;

conducting said decoupled reference bundle over a second waveguide;

decoupling said beam from the plane of said first waveguide by a decoupling grid after decoupling said reference bundle, said beam directed to a reflecting element on the object wherein the beam is reflected from the object;

coupling said reflected beam via a coupling-in grid to a third waveguide;

inputting said reference bundle conducted in said second waveguide and said reflected beam conducted in said third waveguide to a coupler, said coupler bringing said input signals into interference; and detecting said interference in said coupler and generating phase displaced signals representative of said interference.

* * * * *

UNITED STATES PATENT AND TRADEMARK OFFICE
CERTIFICATE OF CORRECTION

PATENT NO. : 5,187,545
DATED : February 16, 1993
INVENTOR(S) : Michael Allgäuer

It is certified that error appears in the above-indentified patent and that said Letters Patent is hereby corrected as shown below:

In column 3, line 22, delete "1a" and substitute therefor --1a--.

Column 6, line 15, claim 9, after "said" insert --reference--.

Signed and Sealed this

Twenty-third Day of August, 1994

Attest:

BRUCE LEHMAN

*Attesting Officer*      *Commissioner of Patents and Trademarks*